Dec. 6, 1960 R. WHITE 2,963,358
PRODUCTION OF GRANULAR FERTILIZERS
Filed Nov. 17, 1955 2 Sheets-Sheet 1

INVENTOR.
Robert White
BY Carl C. Baty,
Attorney

United States Patent Office 2,963,358
Patented Dec. 6, 1960

2,963,358

PRODUCTION OF GRANULAR FERTILIZERS

Robert White, Atlanta, Ga., assignor to Armour and Company, Chicago, Ill., a corporation of Illinois Filed Nov. 17, 1955, Ser. No. 547,442

5 Claims. (Cl. 71—37)

This invention relates to the production of granular fertilizers. In general, the invention relates to the production of available phosphates from phosphate rock, and more particularly to a process for the production of a plurality of grades of fertilizer containing "available" phosphates.

Figure 1:
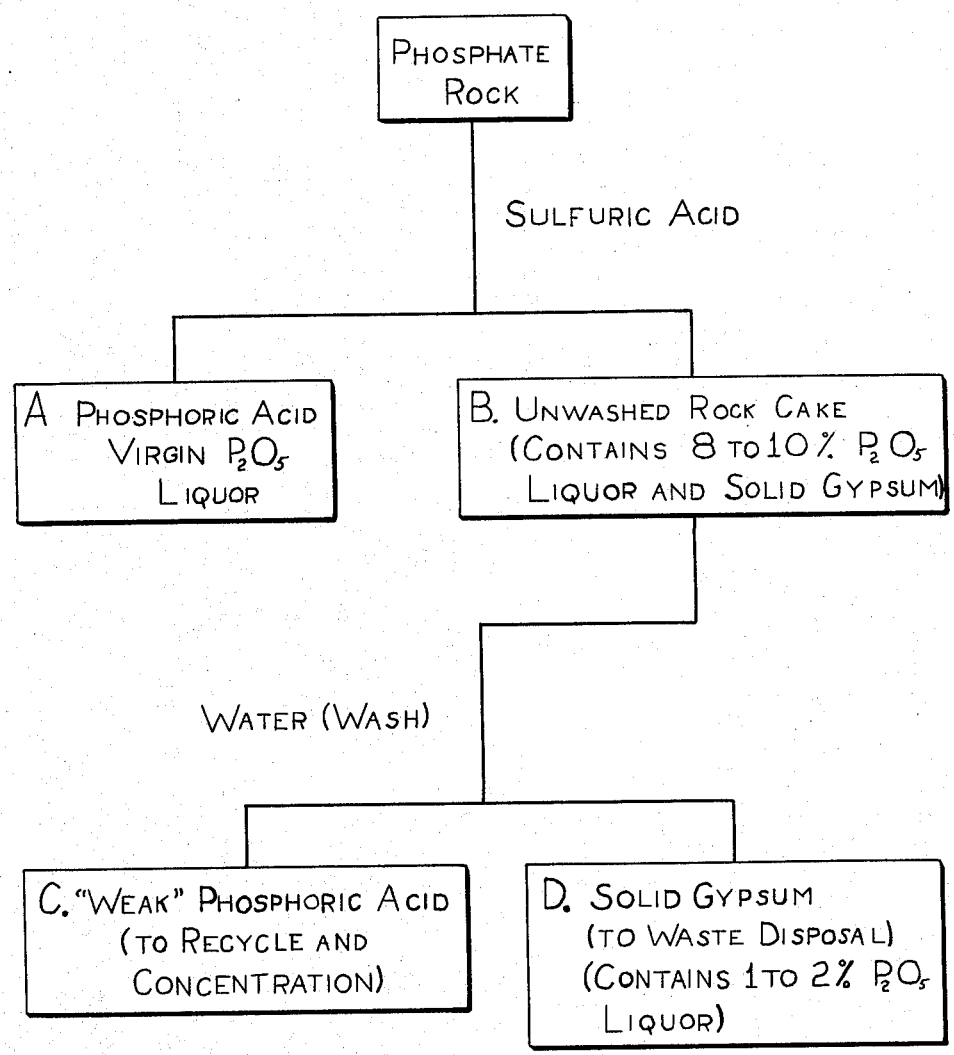

In the ordinary method which is used by the fertilizer industry for producing phosphoric acid ($P_2O_5$ liquor) from phosphate rock, the procedure is that shown in the flow diagram presented as Fig. 1 of the drawing. As may be seen in the flow diagram, the phosphate rock is treated with sulfuric acid to produce a mixture of phosphoric acid and crude gypsum, which mixture is then separated to produce (A) phosphoric acid (virgin $P_2O_5$ liquor) and (B) unwashed rock cake (containing solid gypsum and 8 to 10% $P_2O_5$ liquor). Following this, the unwashed rock cake (B) is washed with water and separated to produce (C) "weak" phosphoric acid and (D) solid gypsum.

The virgin $P_2O_5$ liquor (A) produced by this method is extremely valuable in the preparation of high grade fertilizers.

On the other hand, the unwashed rock cake (B) has always presented a problem to the industry. As indicated above, it is made up mostly of gypsum, which is a hydrated calcium sulfate, but it also contains from 8 to 10% $P_2O_5$ liquor, which remains as a residue in the rock cake after the separation noted above. In order to remove $P_2O_5$ liquor from the rock cake, it is necessary to go through a costly water washing step, and even then the end product is a very dilute $P_2O_5$ liquor (C) which must be recycled and concentrated in order to be useful for the purpose.

The washing step has been a distateful one to the industry since it involves the use of additional expensive filters, tanks, pumps, and condensing apparatus. Moreover, the washing step is not capable of removing all the $P_2O_5$ liquor from the gypsum cake, so that there is always a loss of 1 or 2% residual $P_2O_5$ liquor which can not be salvaged from the cake.

Even further, the washed gypsum cake (D) is a by-product or waste product, and in the continuous operation of a fertilizer plant over a period of time, vast amounts of this so-called "land plaster" must be piled on adjacent land or confined in vast ponds. The seriousness of this problem can be understood when it is realized that, in order to obtain sufficient $P_2O_5$ liquor for one ton of triple superphosphate, it necessarily entails the production of 1¾ tons of gypsum as a by-product to be piled. In order to pile these tremendous amounts of gypsum, the fertilizer producer requires large acreage of land, and since many fertilizer plants are situated on the waterfront in order to take advantage of cheap transportation, it will be realized that the use of relatively expensive water-front acreages merely for piling a by-product such as gypsum is a practice which is accepted only as a necessary evil in the ordinary manufacture of fertilizer.

It is the object of the present invention to provide a process which overcomes the difficulties just described. More particularly, it is an object of the present invention to eliminate the costly washing of phosphate rock cake and also to eliminate the need for piling gypsum or "land plaster" over acres of land. It is another object to effect fuel savings in the drying of the finished product and also to avoid the usual $P_2O_5$ losses which are encountered in the discarding of substantial residues of $P_2O_5$ along with the gypsum by-product. A further object of the invention is to provide a method of producing fertilizers of improved granular character. Other specific objects and advantages will appear as the specification proceeds.

The present invention is based on the discovery that the unwashed rock cake, with its 8 to 10% of $P_2O_5$ liquor, can be used as a source of available $P_2O_5$ in the preparation of low or medium grade fertilizers, while at the same time the virgin $P_2O_5$ liquor separated from the rock cake may be used in the preparation of high grade fertilizers.

Although it may seem unusual to use a material containing only 8 or 10% of $P_2O_5$ liquor and a major quantity of solid gypsum as a source of available $P_2O_5$, the fact is that the addition of gypsum along with the $P_2O_5$ does not harm the product, but quite to the contrary provides a much better type of granular product, since the gypsum combines with the ammonium phosphate which is present in the fertilizer to provide a non-stick coating for each granule.

Since all of the unwashed rock cake is used as a source of available $P_2O_5$, the problem of using acres of land for the piling of gypsum by-product is eliminated. Moreover, this addition of all the unwashed cake insures utilization of even the last trace of $P_2O_5$, so that the usual loss of residual $P_2O_5$ in the cake is also avoided; and, further, there is the savings inherent in eliminating the washing and concentration steps.

The present invention, therefore, contemplates the treatment of phosphate rock with sulfuric acid, followed by separation of the virgin $P_2O_5$ liquor from the rock cake, as indicated in Fig. 1 of the drawing. Then, proceeding from this point, the unwashed rock cake is used as a source of available $P_2O_5$ in the preparation of a lower or medium grade fertilizer. In producing this fertilizer, if the unwashed rock cake does not happen to provide all the $P_2O_5$ which the formula calls for, then it is possible to use a small portion of the virgin $P_2O_5$ liquor to make up this amount, thus leaving a major portion of the virgin $P_2O_5$ liquor available for the production of high grade fertilizers. The other ingredients to which the unwashed rock cake is added to prepare the lower or medium grade fertilizers may include sulfuric acid, nitric acid (or a mixture of the two), superphosphate, and ammoniacal nitrogen, and the mixture also contains whatever water has been retained in the rock cake. The final step in the production of the lower or medium grade fertilizers is that of tumbling the mixture in a drying atmosphere within a rotary container to produce a nodular product.

The remaining virgin $P_2O_5$ liquor may then be employed to prepare a high analysis fertilizer. In producing such fertilizer, the virgin $P_2O_5$ liquor may be added to superphosphates and ammoniacal nitrogen, or other sources of nitrogen and $K_2O$.

Figure 2:
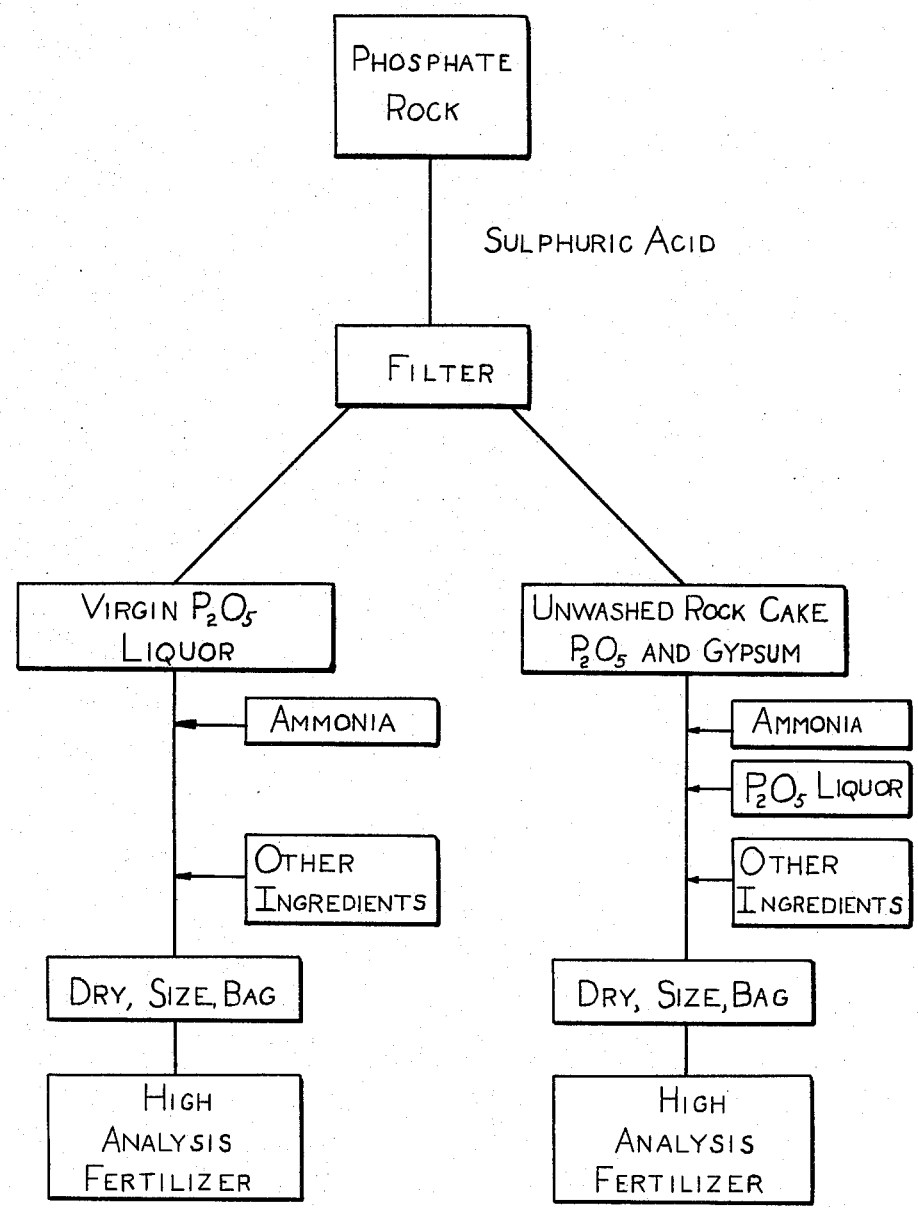

In the process of the present invention, the ingredients can be maintained in slurry or plastic form at all stages. A diagrammatic flow sheet showing how the method can be employed on a continuous basis for the simultaneous production of high and low analysis fertilizers is presented in Fig. 2 of the drawing.

ADVANTAGES

The process of the present invention provides the following advantages over the existing procedures for preparing granular fertilizers:

A. In the existing practices, the usual procedure is to mix a number of ingredients which have previously been dried and kept in storage or shipped in from some other plant. This dried mixture must be reconstituted with water and then dried again as a mixture to obtain anything resembling a granular form. In the process of the present invention, the ingredients may be maintained in slurry or plastic form at all stages. Thus, for example, referring to Fig. 2 of the drawings, the unwashed rock cake contains approximately 25% moisture, and this is sufficient to maintain the entire mixture in a degree of plasticity until the time the ingredients are run into the rotary dryer. This eliminates the need for adding moisture, as must be done in the conventional method when granular fertilizer is desired from a mixture of dry ingredients. Further, by running a slurry of this character directly into a rotary dryer, it is possible to obtain a much more desirable granulating effect than can be achieved in the prior method of first drying all the ingredients separately, then mixing the dry materials, wetting the dry mixture with water, and then drying again. This improved granulated effect, which results from the use of the slurry, when combined with the additional improvement in granulation brought about by the presence of gypsum and ammonium phosphate in the slurry, causes a marked upgrading in the granular properties of the end product. The granules produced by the present process are hard and well coated with non-hygoscopic materials, which prevent knitting and caking on storage in bulk or bags.

B. The addition of ammonia to the slurry, which contains phosphoric acid, not only provides a necessary nitrogen requirement for the product but also causes a heat of reaction which effects a considerable savings in fuel. In other words, the next step after addition of ammonia and other ingredients in applicant's process is to run the slurry through a rotary dryer, and since the addition of ammonia raises the temperature of the slurried mass just as it is about to enter the dryer, and since the dryer employs heat as a means of drying the mass, the addition of ammonia to the slurry effects a fuel savings over the conventional method wherein the previously dried ingredients are merely mixed, wet down with water, and then dried again.

C. The process of the present invention affords a short time, continuous method for producing low or medium grade fertilizers, while at the same time making virgin $P_2O_5$ liquor available in large quantities for the production of high grade fertilizers.

D. Since the washing of the rock cake is eliminated, all the expenses of the washing step are also avoided. This includes labor, as well as expensive filters, tanks, and pumps. Further, since the washing step dilutes the $P_2O_5$ liquor with water, so that in the conventional method the $P_2O_5$ liquor must be concentrated, the new process also eliminates the need for expensive concentrating equipment.

E. The use of the unwashed rock cake as a source of available $P_2O_5$ in preparing medium and low grade fertilizers avoids the usual $P_2O_5$ losses which are encountered in the old method. Since it has been impossible to wash out all the $P_2O_5$ liquor from the rock cake, it follows that substantial residues of $P_2O_5$ were discarded along with the gypsum by-product. This loss is avoided in the present process, wherein the gypsum rock cake is not discarded, but rather is used in preparing the fertilizer.

F. By use of the unwashed rock cake as an ingredient in fertilizer, the sulfur and calcium in the gypsum remain in the mixtures for soil improvement rather than building up as large dumps of gypsum.

The following examples are intended to illustrate the invention in several of its aspects and are not to be construed as limiting thereof:

*Example I*

A quantity of phosphate rock was acidulated in the usual manner with sulfuric acid, and the virgin $P_2O_5$ liquor was separated from the rock cake by vacuum filtration. The $P_2O_5$ liquor was used for the production of a granular high analysis (8–16–8) mixture, and the unwashed cake for the production of a granular low analysis (5–10–5) mixture, as follows:

[Granular 8–16–8]

| Materials | Lbs. | Lbs. $H_2O$ | Lbs. N | Avail. Lbs. $P_2O_5$ | Lbs. $K_2O$ |
|---|---|---|---|---|---|
| Phos. Rock Dust | 520 | Nil | | 180 | |
| 60% Sulphuric Acid | 670 | 270 | | | |
| Anhydrous Ammonia | 100 | Nil | 82 | | |
| Muriate of Potash | 270 | Nil | | | 162 |
| $P_2O_5$ Liquor | 560 | 340 | | 140 | |
| Sulphate of Ammonia | 380 | Nil | 80 | | |
| | 2,500 | 610 | 162 | 320 | 162 |
| Dry to | 2,000 lbs. | 5.5% | 8.1% | 16.0% | 8.1% |

[Granular 5–10–5 (Slurry $P_2O_5$ Cake Method)]

| Unwashed Cake | $H_2O$ 25.0% | $P_2O_5$ 8.0% | Insol. $P_2O_5$ 0.10% |
|---|---|---|---|

| Materials | Wt., Lbs. | Lbs. $H_2O$ | Lbs. N | Lbs. $P_2O_5$ | Lbs. $K_2O$ |
|---|---|---|---|---|---|
| Unwashed cake | 1,000 | 250 | | 80 | |
| Muriate of Potash | 170 | Nil | | | 102 |
| 50% Sulphuric Acid | 200 | 100 | | | |
| Anhydrous Ammonia | 50 | | 41.0 | | |
| Nitrogen Solution | 100 | 13 | 40.5 | | |
| Sulphate of Ammonia | 90 | Nil | 18.8 | | |
| Superphosphate | 630 | 63 | | 123 | |
| Filler | 85 | Nil | | | |
| | 2,325 | 426 | 100.3 | 203 | 102 |
| Dry to | 2,000 lbs. | 5% | 5.01% | 10.1% | 5.1% |

*Example II*

The virgin $P_2O_5$ liquor referred to in Example I may also be used to prepare a granular high analysis (10–20–10) mixture, as follows:

[Granular 10–20–10 (Slurry Method)]

| Materials | Wt., Lbs. | Lbs. $H_2O$ | Lbs. N | Lbs. $P_2O_5$ | Lbs. $K_2O$ |
|---|---|---|---|---|---|
| $P_2O_5$ Liquor | 1,400 | 800 | | 350 | |
| Phosphate Rock Dust | 200 | | | 68 | |
| Anhydrous Ammonia | 250 | | 204 | | |
| Muriate of Potash | 330 | | | | 202 |
| Sulphuric Acid—60° Bé | 700 | 155 | | | |
| | 2,880 | 955 | 204 | 418 | 202 |
| Dry to | 2,000 lbs. | 3.7% | 10.2% | 20.9% | 10.1% |

*Example III*

The unwashed rock cake referred to in Example I may be used in a different manner to produce a granular low analysis (5–10–5) mixture, according to the following:

[Granular 5–10–5]

| Materials (In Pounds) | Water | N | Total $P_2O_5$ | $K_2O$ |
|---|---|---|---|---|
| 400 Returned Fines | 8 | 20 | 44 | 20 |
| 140 Mur. Potash | | | | 80 |
| 1,500 $P_2O_5$—Gypsum Cake | 335 | | 150 | |
| 100 $P_2O_5$ Liquor | 55 | | 30 | |
| 60 Anhydrous Ammonia | | 48 | | |
| 160 Sul. of Ammonia | 2 | 32 | | |
| 2,330 lb. charge | 400 | 100 | 224 | 100 |
| 2,000 lb. Dried Weight | 360 | | | |
| Dried Analysis, percent | 40 2 | 5 | 11.2 | 5 |

While in the foregoing specification I have set forth examples in which steps or process are set out in considerable detail, it will be understood that such details may be varied widely by those skilled in the art without departing from the spirit of my invention.

I claim:

1. A process for the production of a plurality of grades of granular fertilizer, comprising treating phosphate rock with sulfuric acid to produce phosphoric acid and rock cake, drawing off phosphoric acid from the rock cake, employing phosphoric acid drawn off from said rock cake in the production of a high grade fertilizer, mixing the unwashed rock cake with a dilute acid selected from the group consisting of sulfuric, phosphoric, and mixtures thereof, adding phosphate rock dust and superphosphate to the mixture, and tumbling the resultant mixture in a drying atmosphere and within a rotary container to produce a lower grade granular product.

2. A process for the production of a plurality of grades of granular fertilizer, comprising treating phosphate rock with sulfuric acid to produce phosphoric acid and rock cake, drawing off phosphoric acid from the rock cake, employing phosphoric acid drawn off from said rock cake in the production of a high grade fertilizer, mixing the unwashed rock cake with a dilute acid selected from the group consisting of sulfuric, phosphoric, and nitric acids, and mixtures thereof, adding superphosphate and ammoniacal nitrogen to the mixture, and tumbling the resultant mixture in a drying atmosphere and within a rotary container to produce a lower grade granular product.

3. A process for the production of a plurality of grades of granular fertilizer, comprising treating phosphate rock with sulfuric acid to produce phosphoric acid and rock cake, drawing off phosphoric acid from the rock cake, employing phosphoric acid drawn off from said rock cake in the production of a high grade fertilizer, repulping the unwashed rock cake with a slurry consisting of dilute sulfuric acid and phosphate rock dust, adding to the mixture superphosphate and ammoniacal nitrogen, and tumbling the resultant mixture in a drying atmosphere and within a rotary container to produce a lower grade granular product.

4. A process for the production of a plurality of grades of granular fertilizer, comprising treating phosphate rock with sulfuric acid to produce phosphoric acid and rock cake, drawing off phosphoric acid from the rock cake, employing phosphoric acid drawn off from said rock cake in the production of a high grade fertilizer, repulping the unwashed rock cake with a slurry consisting of dilute sulfuric acid and phosphate rock dust, adding ammoniacal nitrogen and tumbling the resultant mixture in a drying atmosphere and within a rotary container to produce a lower grade granular product.

5. A process for the production of a plurality of grades of granular fertilizer, comprising treating phosphate rock with sulfuric acid to produce phosphoric acid and rock cake, drawing off phosphoric acid from the rock cake, employing phosphoric acid drawn off from said rock cake in the production of a high grade fertilizer, repulping the unwashed rock cake with dilute phosphoric acid, adding to the mixture superphosphate and ammoniacal nitrogen, and tumbling the resultant mixture in a drying atmosphere and within a rotary container to produce a lower grade granular product.

References Cited in the file of this patent

UNITED STATES PATENTS

| | | |
|---|---|---|
| 276,143 | Knight et al. | Apr. 17, 1883 |
| 389,566 | Glaser | Sept. 11, 1888 |
| 1,836,672 | Larsson | Dec. 15, 1931 |
| 1,944,048 | Walker et al. | Jan. 16, 1934 |
| 1,972,196 | Larison | Sept. 4, 1934 |
| 2,013,970 | Moore | Sept. 10, 1935 |
| 2,106,223 | Nordengren | Jan. 25, 1938 |
| 2,115,150 | Seyfried | Apr. 26, 1938 |
| 2,136,793 | Gabeler et al. | Nov. 15, 1938 |

FOREIGN PATENTS

| | | |
|---|---|---|
| 559,482 | Great Britain | Feb. 22, 1944 |